United States Patent
Carver et al.

(10) Patent No.: US 7,308,603 B2
(45) Date of Patent: Dec. 11, 2007

(54) METHOD AND SYSTEM FOR REDUCING MEMORY FAULTS WHILE RUNNING AN OPERATING SYSTEM

(75) Inventors: Brian L. Carver, Raleigh, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/968,548

(22) Filed: Oct. 18, 2004

(65) Prior Publication Data
US 2006/0085670 A1    Apr. 20, 2006

(51) Int. Cl.
*G06F 11/00* (2006.01)
(52) U.S. Cl. .......................................... 714/8; 714/723
(58) Field of Classification Search .................... 714/8, 714/723
See application file for complete search history.

(56) References Cited

U.S. PATENT DOCUMENTS

| | | | | |
|---|---|---|---|---|
| 5,109,360 A | | 4/1992 | Inazumi et al. ............. | 365/200 |
| 5,396,619 A | * | 3/1995 | Walton ........................... | 714/8 |
| 5,713,024 A | | 1/1998 | Halladay .................... | 395/712 |
| 6,006,311 A | * | 12/1999 | Arimilli et al. .............. | 711/133 |
| 6,230,286 B1 | | 5/2001 | Shapiro et al. ................ | 714/23 |
| 6,463,550 B1 | | 10/2002 | Cepulis et al. ................ | 714/25 |
| 6,523,141 B1 | | 2/2003 | Cantrill ........................ | 714/48 |
| 6,671,645 B2 | * | 12/2003 | Maxham ...................... | 702/117 |
| 6,742,148 B1 | * | 5/2004 | Korhonen .................... | 714/718 |
| 7,093,166 B2 | * | 8/2006 | Mohammad ................. | 714/42 |
| 7,107,493 B2 | * | 9/2006 | Nguyen et al. ............... | 714/42 |
| 2002/0129186 A1 | | 9/2002 | Emerson et al. ............ | 710/302 |

FOREIGN PATENT DOCUMENTS

JP    11234457    8/1999

OTHER PUBLICATIONS

IBM Technical Disclosure Bulletin, E.J. Schmitt and A.R. Treu, *Using Split Memory to Back-Up System Memory*, vol. 37, No. 07, Jul. 1994.

* cited by examiner

*Primary Examiner*—Gabriel Chu
(74) *Attorney, Agent, or Firm*—Sawyer Law Group LLP

(57) ABSTRACT

Method and system for reducing memory faults for computer systems. In one aspect, a notification is received that indicates that a single bit error has been detected in a portion of memory of the computer system. A service program is used to isolate the portion of the memory that includes the detected single bit error by allocating the portion of memory to itself, such that the portion of memory may no longer be accessed for data reading or writing by programs running on the computer system.

33 Claims, 3 Drawing Sheets

METHOD AND SYSTEM FOR REDUCING MEMORY FAULTS WHILE RUNNING AN OPERATING SYSTEM

FIELD OF THE INVENTION

The present invention relates to memory fault reduction in computer systems, and more particularly to the reduction of memory faults while running an operating system.

BACKGROUND OF THE INVENTION

As the use of servers for database and computer applications increases, the need also increases for robust systems that can detect failures in the system that have occurred and reduce or prevent errors and failures from occurring. One type of failure that can occur is memory errors that occur in physical memory, such as random access memory (RAM) or other types of memory. Bits of data stored in physical memory cells may be corrupted upon writing, reading, or during storage. For example, unexpected or unwanted changes in the value of a stored bit may occur somewhere in the memory when a bit suddenly and randomly changes state, resulting in errors in the data. Or, a noise pulse (electronic interference), crosstalk, or glitch in the circuits or busses of a device may occur and can be misinterpreted in memory as a data bit or address bit. Other errors can occur in the memory chips as a result of electromagnetic radiation, or radioactive decay in the atoms of the epoxy of the plastic chip package of the chip which causes a memory cell to change state. Sometimes, a part of a memory chip can physically fail, causing recurring errors, and rebooting the system does not alleviate the condition, thus requiring the memory chip to be replaced. "Soft" errors are those errors that generally result from transient events such as noise, crosstalk, or radiation, and may not indicate any serious or recurring problem with the memory at particular storage locations, while "hard" errors are those which result from a failure in the hardware which may permanently cause recurring errors. In recent years, as system memory is much increased in density (i.e. more memory is stored on fewer physical devices), the possibility for memory errors poses a far greater threat to system availability. Thus, protection against system memory failures becomes increasingly important.

To alleviate the effects of such errors, many computer systems such as servers employ schemes to detect and correct memory errors. Some of these schemes are called Error Correcting Code (or sometimes Error Checking and Correcting) (ECC). Commonly-used ECC schemes can typically detect and correct single-bit errors, where extra check bits are generated with the data as it is written to memory, and allow the system to check the bits to detect the presence of a single bit error, locate which bit is in error, and correct that single-bit error as the data is read from memory. The occurrence of the error is also recorded. This technique can thus fix single bit errors without halting or rebooting the system.

Many systems have focused on the detection and correction of single bit errors; however, multi-bit errors can and do occur. Multi-bit errors, such as double bit errors, are two or more bit errors occurring within a predefined storage unit, typically a byte. With shrinking geometries of memory circuits resulting from advancement in semiconductor process technology, the importance of multi-bit errors may be increasing relative to single bit errors. Once a single bit error occurs in a portion of memory, the probability that a double bit error will occur in that same portion of memory increases; this is because, if a single bit error occurs, it may indicate that that portion of memory is prone to noise errors or glitches, or will soon have a hardware failure.

Commonly-used ECC and other schemes allow for the detection and correction of single bit errors, and the detection of double bit errors in memory data. However, these commonly-used schemes are typically not be able to correct any double bit errors that are detected. Thus, if a single bit error is detected, that error is corrected and the memory is monitored for further errors, but if a double bit error is detected, then the system logs the error and immediately stops the system from processing to avoid data corruption. After the system is halted, the memory can be removed or replaced, and the system rebooted. Schemes exist for the correction of double-bit or multi-bit errors, but these are not commonly used.

The disadvantage of halting the system and its programs and rebooting the system after a double bit error occurs is that some applications running on the system are deemed "mission critical" and cannot adequately perform their intended function if interrupted. For example, heart monitoring equipment that is controlled by software should not be stopped due to memory errors and only resumed after rebooting the system, as rebooting heart monitoring software would leave a patient at risk while the reboot took place.

Accordingly, what is needed is an apparatus and method for reducing the occurrence of double bit memory faults in computer systems while running an operating system, without having to stop processing and reboot the system. The present invention addresses such a need.

SUMMARY OF THE INVENTION

The invention of the present application relates to a system and method for reducing memory faults while running an operating system for a computer. In one aspect of the invention, a method for reducing memory faults in a computer system includes receiving a notification that a single bit error has been detected in a portion of memory of the computer system, and using a service program to isolate the portion of the memory that includes the detected single bit error by allocating the portion of memory to itself, such that the portion of memory may no longer be accessed for data reading or writing by all programs running on the computer system. A similar aspect of the invention provides a computer readable medium for implementing similar features.

In another aspect of the invention, a system for reducing memory faults in a computer system includes a firmware running on the computer system that is operative to detect a single bit error in memory of the computer system, and a service program operative to receive a notification from the system interrupt program that a single bit error has been detected in a memory of the computer system, wherein the service program is operative to allocate to itself a portion of memory that includes the detected single bit error such that the portion of memory is isolated and may not be accessed for data reading or writing.

In another aspect of the invention, a method for reducing memory faults in a computer system includes receiving a notification from firmware that a single bit error has been detected in a portion of memory of the computer system, and using a service program to allocate to itself the portion of the memory that includes the detected single bit error such that the portion of memory is isolated and may no longer be accessed for data reading or writing by other programs. If any programs are currently using the portion of memory that includes the detected single bit error, the contents of the portion of memory are reallocated to a different portion of memory or to a different storage area.

The present invention allows a computer system to reduce the faults that occur in a memory while the system is running. By isolating portions of memory in which a bit error has occurred, the present invention prevents single or double bit errors occurring again in that portion of memory from affecting the performance of the system. Furthermore, the handling of memory portions in the present invention occurs while the system is continuously running, allowing critical applications to maintain performance without interruption due to memory faults.

DETAILED DESCRIPTION

The present invention relates to memory fault reduction in computer systems, and more particularly to the reduction of memory faults while running an operating system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the server or computer system usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1-3 in conjunction with the discussion below.

Figure 1:
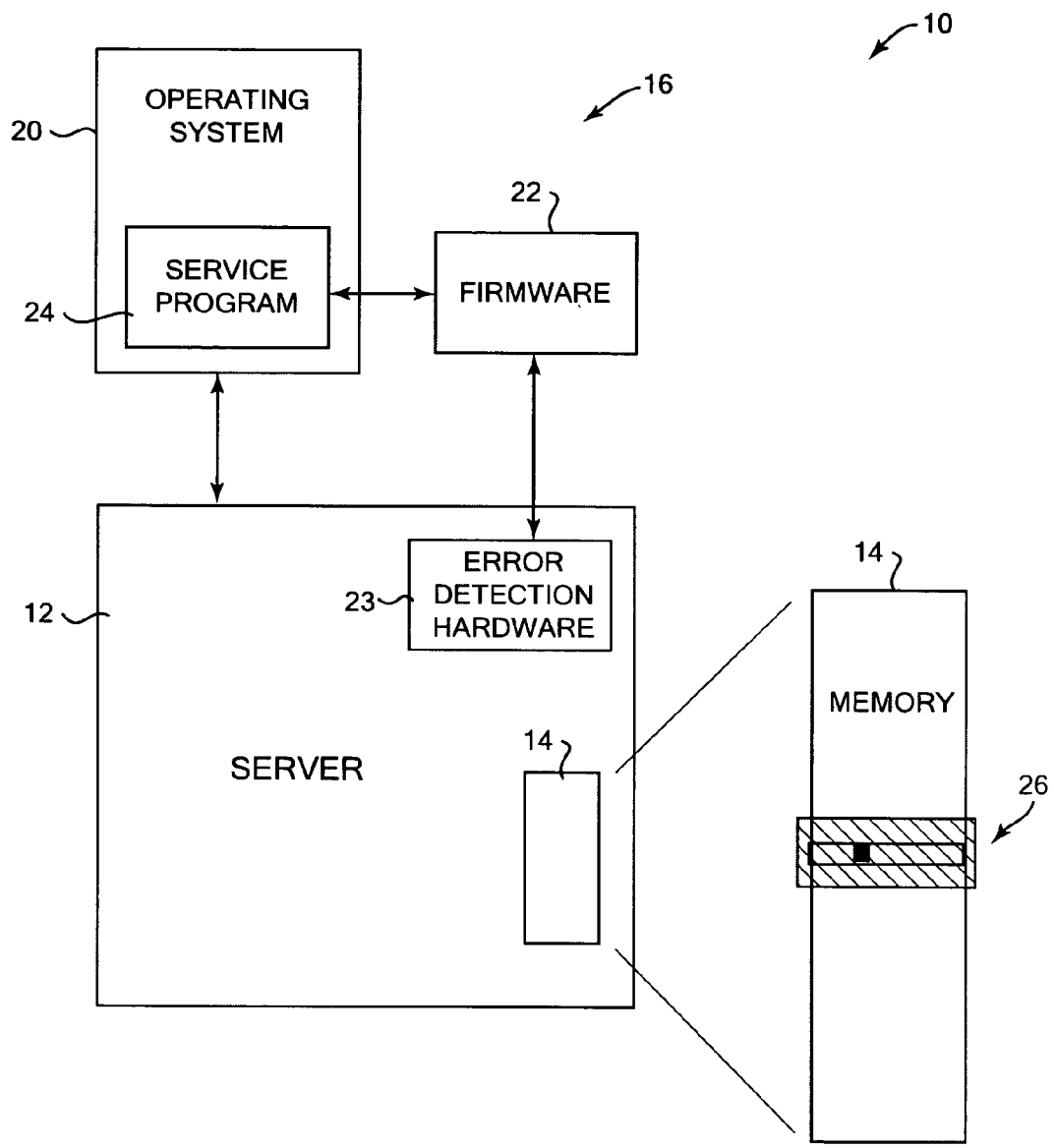
FIG. 1 is a block diagram illustrating a system including features of the present invention.

FIG. 1 is a block diagram illustrating a system 10 suitable for use with the present invention. System 10 includes a server 12 that has memory 14 for storing data. Server 12 is running a number of programs 16.

Server 12 can be any computer system or electronic device which can use memory to store data used in its operation. For example, server 12 can be a desktop computer, workstation, mainframe computer, laptop computer, personal digital assistant, etc. The server includes one or more microprocessors and other suitable components, such as memory 14 (described below), input/output components and devices, storage devices, etc. One suitable server 12 for the present invention is a computer having a microprocessor from Intel Corporation. In one application suitable to the present invention, the server 12 is operating over long continuous time periods, in which robustness in the components of the server 12 are desired. For example, a server 12 that is available to other computers over a network such as the Internet, often needs to be running continuously for long periods.

Memory 14 is provided in server 16 to store data used by the server 16 and programs running on the server. Memory can be of various types, including volatile and non-volatile, e.g., read-only memory (ROM), random access memory (RAM), electrically-erasable programmable read-only memory (EEPROM), flash memory, etc. Occasionally, one or more bits stored in the memory 14 can develop an error and switch state, for any of a variety of reasons, including noise, glitches, radioactive decay, hardware failure, etc.

Programs 16 are run on the server 12, in addition to other programs (not shown). Programs 16 include an operating system 20, which enables and directs many operations of the programs running on the server. The operating system 20 can be any suitable operating system, such as Windows by Microsoft Corp., a version of the Linux operating system, or MacOS by Apple Computer, Inc. Typically, the operating system 20 can communicate with hardware components in server 12 using other lower level programs, such as drivers.

Firmware 22 is code that executes independently of the operating system 20, and is typically stored, for example, in ROM or programmable ROM (PROM). The firmware 22, or a related program in communication with firmware 22, can be always running on server 16. For example, in relation to the present invention, firmware 22 is always running, and monitors whether single or double bit errors occur in the memory 14 and records those errors. The term "firmware," as used herein, covers any one or more programs (and/or hardware) which monitor for bit errors in memory 14. The firmware 22 knows the location of bit errors in the memory 14 when they occur, and can notify other system entities (such as service program 24) about detected errors. In typical embodiments, error detection hardware 23 on the server 12 performs the actual bit error detection, e.g., setting and checking associated bits of each memory cell read from or written, and if an error is found by the hardware 23, it informs the firmware 22 when the error occurs and the location of the error. The detection hardware 23 can typically also perform error correction, e.g., when instructed by firmware 22.

For example, in some embodiments in which server 12 is an Intel-microprocessor based system, the firmware 22 can include an SMI (System Management Interrupt) program and an NMI (Non-Maskable Interrupt) program. The SMI and NMI, for example, can be included in the BIOS (Basic Input Output System) code for the computer system in ROM or similar memory. The NMI program is constantly running and checks for the occurrence of bit errors, e.g., using ECC techniques in conjunction with the hardware 23; the NMI program can be called by the hardware 23 to capture critical data such as error detection and location. When a bit error is found, the NMI program calls or triggers the SMI program, and passes the error information to the SMI program. The SMI program is used for several different operating-system-independent functions, including monitoring of single and multiple bit errors.

A service program 24 of the present invention runs under the operating system 20 and handles operations when errors have occurred in memory 14. Service program 24 can communicate with the operating system 20 and can influence other applications and programs that may be running under operating system 20. According to the present invention, service program 24 also can communicate with the firmware 22 to gain access to the lower-level memory functions that the firmware 22 performs. In the preferred embodiment, the service program 24 can receive information from the firmware 22 about when a single bit error occurs, and where that error occurs. This is more communication between the firmware 22 and operating system 20 than is typically performed in prior systems. Once the service program 24 has received the necessary information, it can perform functions on the memory 14 to alleviate the errors detected therein, including isolating a portion 26 of memory 14 in which the error occurred. This is described in greater detail below with respect to FIG. 2.

Figure 2:
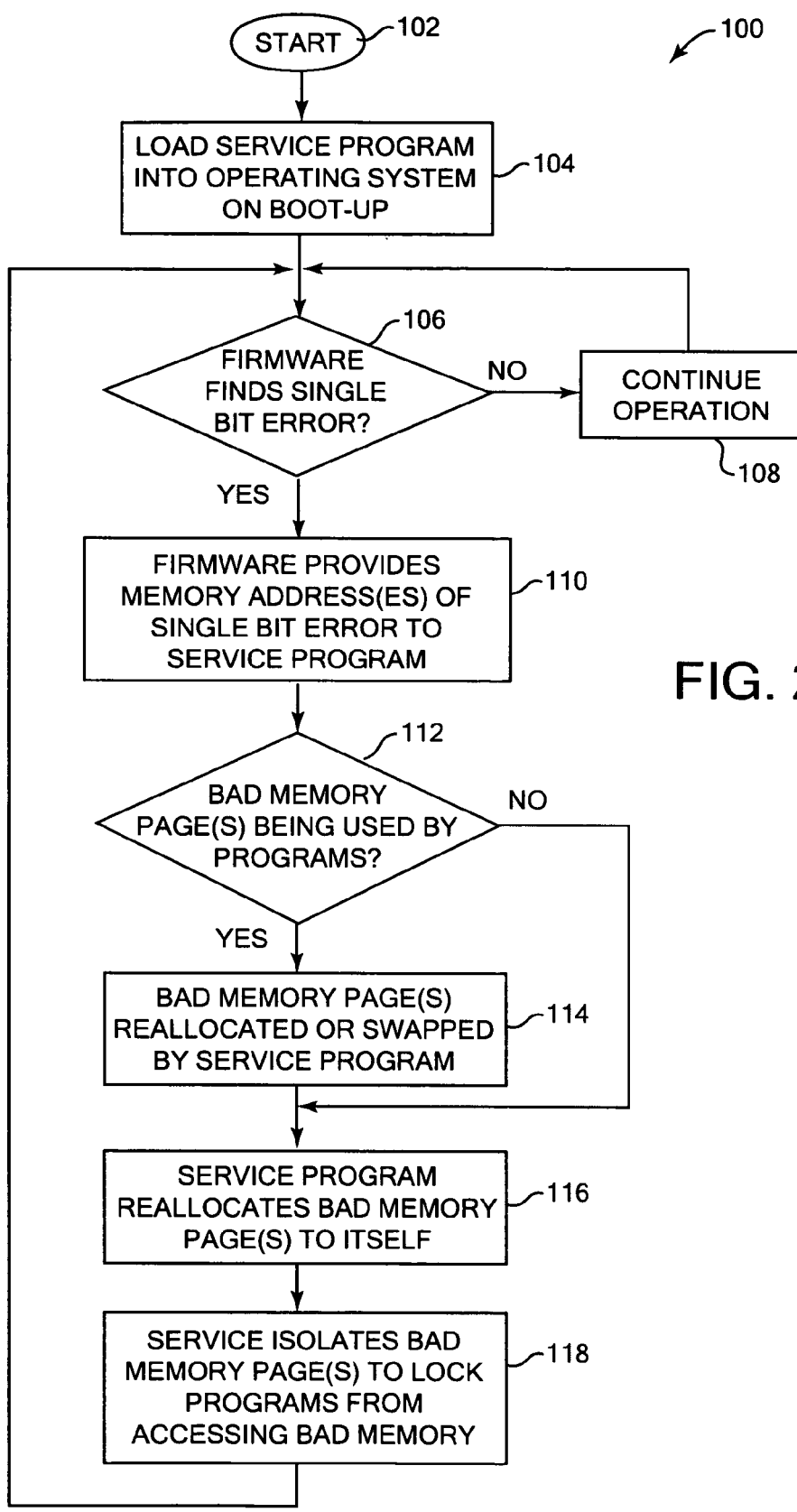
FIG. 2 is a flow diagram illustrating a method of the present invention for reducing memory faults while running an operating system.

FIG. 2 is a flow diagram illustrating a method 100 of the present invention for reducing memory faults in a computer system while running an operating system. The steps of method 100 (and method 200) can be implemented using program instructions stored on a computer readable medium, such as memory, hard drive, optical disk (CD-ROM, DVD-ROM, etc.), magnetic disk, etc. and executed by the server 16. Alternatively, these steps can be implemented in hardware (logic gates, etc.), or a combination of software and hardware.

The method begins at 102, and in step 104, the service program 24 is loaded into the operating system 20 upon boot-up of the server 12. In step 106, once operation of the server 12 has commenced and is continuing, the method checks whether the firmware 22 has found one or more single-bit errors (if a double-bit error is found, the operation of the system is immediately halted, as is well-known). The firmware 22 is able to detect errors via well-known techniques. If no single-bit errors have been found, then operation of the server 12 is continued normally as indicated in step 108, and the process returns to step 106 for continued error checking.

Once one or more single-bit errors are found at step 106, then step 110 is commenced, in which the firmware 22 provides the memory address(es) of the found single bit errors to the service program 24. Thus, in the present invention, the firmware 22 is provided with the necessary code to allow a direct communication path to the service program 24 running within the OS 20 on the server. For example, a standard SMI program can be modified in view of the present invention to provide this communication.

In step 112, the service program 24 checks whether any bad memory page(s) are being used by other programs. The "bad" memory pages are those portions in memory 14, such as a page or block in which the single bit errors were found (generally referred to as "pages" herein, the smallest unit of memory that can be manipulated as described in this method). For example, to implement step 112, the service program 24 can use functions of the operating system 20 to check the memory pages used by programs that are currently running, and compare those memory pages to the bad memory pages found by firmware 22.

If the currently-running programs are not using the bad memory pages, then the process continues to step 116, described below. If any programs are currently using the bad memory pages, then in step 114, the service program reallocates the contents of the bad memory pages to a different page or block in the memory 14, or swaps the contents of the bad memory pages to hard disk or other storage, so that those programs that were using the bad memory portion for data storage are then using a different, error-free block in memory or other storage. If the contents are swapped to a different storage area such as a hard disk, those contents can be swapped back into a different portion physical memory 14 at some point when necessary.

In step 116, the service program 24 reallocates the bad memory page(s) to itself. This indicates that the service program 24 is taking over the use of the bad memory pages, restricting the use of the bad pages to itself. The bad memory pages thus appear as if they are being used to the operating system 20 and other programs running on the system that can access the memory 14. In step 118, the service program isolates the bad memory pages that were allocated to itself in step 116, and locks out all applications, programs, and processes running on the server from accessing the isolated memory pages, i.e. prevents reading and writing of data to the isolated memory pages (including for itself, i.e., the service program 24 will never write or read from the isolated pages). This is accomplished using functions from the operating system, and can vary depending on the operating system and/or hardware being used. For example, many operating systems have the ability to designate certain pages of memory as locked, so that those page contents cannot be "stolen" by programs or the operating system, and those data contents cannot be swapped out to disk.

The process then returns to step 106 to check if the firmware 22 has found any other single bit errors.

The isolated bad memory pages remain isolated, and thus unavailable for use by server 12, while the server 12 continues to be continuously operated. Typically, this is not a problem with servers or computer systems in modem settings, since a large amount of memory is usually available. At some point, the server operation can be halted to allow the bad memory pages to be logged, and repaired, removed, or replaced.

The present invention thus provides a system and method that allows a portion of memory to be reallocated and isolated from use after a single bit error is found therein. The reallocation in step 114 of any data used by currently-running programs can be performed quickly, requiring only a few operations such as a copy and a verification of the new memory which the data is stored, so that the bad memory portions are isolated very quickly after the errors are detected. This reduces or prevents the occurrence of a double bit error in the isolated portion of memory, since the isolated portion is not being used and any such errors are irrelevant. Double bit errors are much more likely to occur in a portion of memory in which a single bit error occurred. Since the reallocation and isolation of bad memory portions can be performed while an operating system is running, and without interrupting the operation of any applications running under the operating system, the present invention increases the robustness of servers running programs with regard to memory errors. This is especially important for programs that are critical for running continuously in real time without interruption, e.g., medical monitoring programs, nuclear reaction control programs, shuttle reentry programs, weapons trajectory software, etc.

Figure 3:
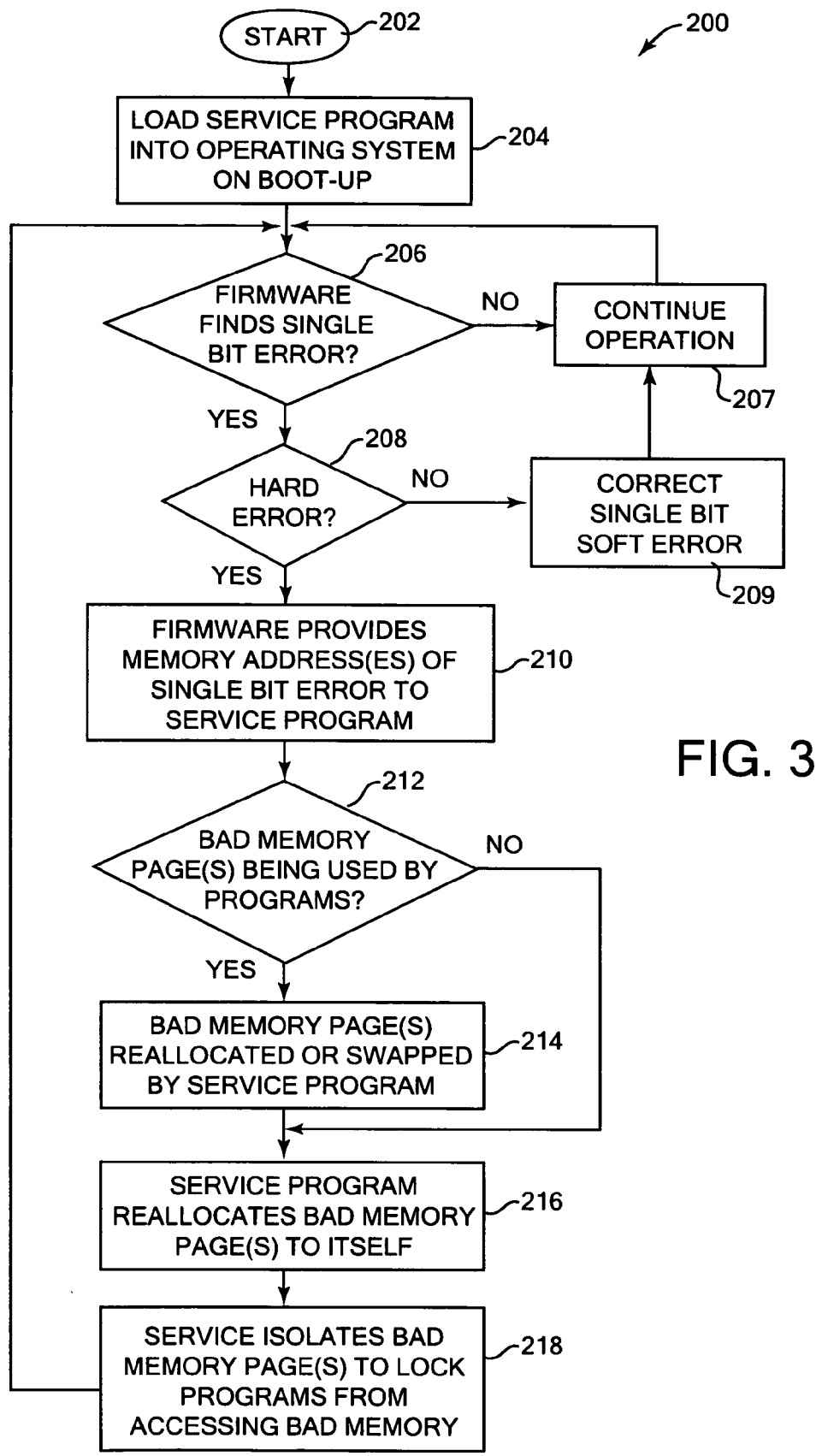
FIG. 3 is a flow diagram illustrating an alternate method of the present invention for reducing memory faults in a computer system while running an operating system, in which the bad memory portions may not be isolated.

FIG. 3 is a flow diagram illustrating an alternate method 200 of the present invention for reducing memory faults in a computer system while running an operating system, in which the bad memory portions may not be isolated. Most of the steps of method 200 are similar to the equivalent steps in method 100 of FIG. 2, except that the method 200 isolates bad memory only if hard errors have been found.

The method begins at 202, and in step 204, the service program 24 is loaded into the operating system 20 upon boot-up of the server 12. In step 206, the method checks whether the firmware 22 has found one or more single-bit errors. If no single-bit errors have been found, then operation of the server 12 is continued normally as indicated in step 207, and the process returns to step 206 for continued error checking.

Once one or more single-bit errors are found at step 206, then in step 208, the process checks whether the found error(s) are hard errors or soft errors. As explained above, hard errors are caused by hardware failings, i.e., a portion of memory 14 is malfunctioning. Soft errors, in contrast, are caused by noise, crosstalk, or glitches, and so might not indicate anything more than a one-time error and thus no serious problems with the memory. Some known error detection schemes can detect whether a bit error is a soft error or a hard error. For example, predictive failure analysis (PFA) routines can be used to track the number of errors occurring within a particular page or block of memory 14 within a predetermined interval of time (in alternative embodiments, individual bytes can be monitored). If a predetermined (or greater) number of errors occurs in the monitored section, then the PFA assumes that the errors are being caused by a hardware problem due to their recurrent nature, and are hard errors. If the number of errors is less than the threshold number, then the error is assumed to be a soft error, which can be corrected.

Thus, if the detected error is not determined to be a hard error, then it is a soft error, and in step 209, the appropriate hardware corrects the single bit error using well-known techniques (e.g., ECC techniques). For example, the firmware 22 (and other settings, e.g., BIOS settings) can instruct the hardware 23 to perform the error correction. The process then returns to step 206 to continue checking for errors. The bad portion(s) of memory is therefore not isolated if the detected error(s) are not hard errors. If a detected bit error is found to be a hard error in step 208, then the process continues to steps 210-218, in which the service program 24 is provided with information about the page of memory holding that error, any contents in the bad page is reallocated, and the bad page of memory is isolated by allocating the bad page to the service program and locking the bad page from use by other programs, similar to the equivalent steps in method 100 of FIG. 2. The process then returns to step 206 to check for other single bit errors.

This alternate method thus only isolates a portion of memory in which the error is found when the error is of a more serious nature that warrants being isolated. If the error is of the less serious nature, that portion of memory is still free to be used by the system after the error is corrected.

The present invention has been described herein as pertinent to server computer systems, but it is also applicable to other systems and devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing memory faults in a computer system, the method comprising:
    receiving a notification that a single bit error has been detected in a portion of memory of the computer system; and
    using a service program to isolate the portion of the memory that includes the detected single bit error by allocating the portion of memory to itself, such that the portion of memory may no longer be accessed for data reading or writing by programs running on the computer system.

2. The method of claim 1 wherein the isolating of the portion of memory is performed while computer system and an operating system of the computer system continue to run normally.

3. The method of claim 1 wherein the service program runs under an operating system that is running on the computer system.

4. The method of claim 3 wherein the service program receives the notification, and wherein the notification is received from firmware that monitors for memory errors.

5. The method of claim 4 wherein the firmware includes a system management interrupt (SMI) program that provides the notification to the service program.

6. The method of claim 1 wherein receiving the notification includes receiving the address in the memory at which the single bit error occurred.

7. The method of claim 1 wherein the isolating of the portion of memory includes determining whether any programs are currently using the portion of memory that includes the detected single bit error.

8. The method of claim 7 wherein if any programs are currently using the portion of memory that includes the detected single bit error, the service program reallocates the contents of the portion of memory to a different portion of memory or to a different storage area.

9. The method of claim 1 wherein the isolating the portion of memory includes locking out all programs, including the service program, from using the portion of memory.

10. The method of claim 1 wherein the portion of memory is isolated if the detected single bit error is determined to be a hard error and not a soft error.

11. The method of claim 1 wherein the portion of memory is isolated if the detected single bit error is determined to be either a hard error or a soft error.

12. The method of claim 1 wherein the portion of memory is isolated after any number of bit errors are detected.

13. A system for reducing memory faults in a computer system, the system comprising:
    firmware running on the computer system that is operative to determine when a single bit error has occurred in a memory of the computer system; and
    a service program operative to receive a notification from the firmware that a single bit error has been detected in the memory of the computer system, wherein the service program is operative to allocate to itself a portion of the memory that includes the detected single bit error such that the portion of memory is isolated and may not be accessed for data reading or writing.

14. The system of claim 13 wherein the service program isolates the portion of memory while computer system and an operating system of the computer system continue to run normally.

15. The method of claim 13 wherein the service program runs under an operating system that is running on the computer system.

16. The system of claim 13 wherein the notification from the firmware includes the address in the memory at which the single bit error occurred.

17. The method of claim 13 wherein the firmware includes a system management interrupt (SMI) program that provides the notification to the service program.

18. The system of claim 13 wherein the service program determines whether any programs are currently using the portion of memory that includes the single bit error.

19. The system of claim 17 wherein the service program reallocates the contents of the portion of memory to a different portion of memory or to a different storage area, if any programs are currently using the portion of memory that includes the single bit error.

20. The system of claim 13 wherein the service program locks out all programs running on the computer system from using the portion of memory.

21. A computer readable medium including program instructions to be implemented by a computer system, the program instructions for reducing memory faults in the computer system, the program instructions implementing steps comprising:
    receiving a notification that a single bit error has been detected in a portion of memory of the computer system; and
    using a service program to isolate the portion of the memory that includes the detected single bit error by allocating the portion of memory to itself, such that the portion of memory may no longer be accessed for data reading or writing by programs running on the computer system.

22. The computer readable medium of claim 21 wherein the isolating of the portion of memory is performed while computer system and an operating system of the computer system continue to run normally.

23. The computer readable medium of claim 21 wherein the service program runs under an operating system that is running on the computer system.

24. The computer readable medium of claim 23 wherein the service program receives the notification, and wherein the notification is received from firmware that monitors for memory errors.

25. The computer readable medium of claim 24 wherein the firmware includes a system management interrupt (SMI) program that provides the notification to the service program.

26. The computer readable medium of claim 21 wherein receiving the notification includes receiving the address in the memory at which the single bit error occurred.

27. The computer readable medium of claim 21 wherein the isolating of the portion of memory includes determining whether any programs are currently using the portion of memory that includes the detected single bit error.

28. The computer readable medium of claim 27 wherein if any programs are currently using the portion of memory that includes the detected single bit error, the service program reallocates the contents of the portion of memory to a different portion of memory or to a different storage area.

29. The computer readable medium of claim 21 wherein the isolating the portion of memory includes locking out all programs running on the computer system, including the service program, from using the portion of memory.

30. The computer readable medium of claim 21 wherein the portion of memory is isolated if the detected single bit error is determined to be either a hard error or a soft error.

31. The computer readable medium of claim 21 wherein the portion of memory is isolated if the detected single bit error is determined to be a hard error and not a soft error.

32. The computer readable medium of claim 21 wherein the portion of memory is isolated after any number of bit errors are detected.

33. A method for reducing memory faults in a computer system, the method comprising:
    receiving a notification from firmware that a single bit error has been detected in a portion of memory of the computer system; and
    using a service program to allocate to itself the portion of the memory that includes the detected single bit error such that the portion of memory is isolated and may no longer be accessed for data reading or writing by all programs, wherein if any programs are currently using the portion of memory that includes the detected single bit error, the contents of the portion of memory are reallocated to a different portion of memory or to a different storage area.

* * * * *